US 6,654,536 B2

(12) United States Patent
Battey et al.

(10) Patent No.: US 6,654,536 B2
(45) Date of Patent: Nov. 25, 2003

(54) FIBER MANAGEMENT FRAME HAVING CONNECTOR PLATFORM

(75) Inventors: Jennifer A. Battey, Euless, TX (US); Steve A. Fontaine, Ft. Worth, TX (US)

(73) Assignee: Corning Cable Systems LLC, Hickory, NC (US)

( * ) Notice: Subject to any disclaimer, the term of this patent is extended or adjusted under 35 U.S.C. 154(b) by 138 days.

(21) Appl. No.: 09/833,891

(22) Filed: Apr. 12, 2001

(65) Prior Publication Data

US 2002/0150369 A1 Oct. 17, 2002

(51) Int. Cl.$^7$ .................................................. G02B 6/00
(52) U.S. Cl. ........................ 385/134; 385/135; 385/137
(58) Field of Search ................................ 385/134–137, 385/147

(56) References Cited

U.S. PATENT DOCUMENTS

| | | | | |
|---|---|---|---|---|
| 4,898,448 A | * | 2/1990 | Cooper ........................ 385/92 |
| 4,911,662 A | * | 3/1990 | Debortoli et al. ........... 361/827 |
| 5,071,211 A | * | 12/1991 | Debortoli et al. ............. 174/50 |
| 5,138,688 A | * | 8/1992 | Debortoli .................... 385/135 |
| 5,231,687 A | * | 7/1993 | Handley ...................... 385/139 |
| 5,490,229 A | * | 2/1996 | Ghandeharizadeh et al. ........................... 385/135 |
| 5,717,810 A | * | 2/1998 | Wheeler ...................... 385/134 |
| 6,061,492 A | * | 5/2000 | Strause et al. .............. 385/134 |
| 6,236,795 B1 | * | 5/2001 | Rodgers ...................... 385/134 |
| 6,385,381 B1 | * | 5/2002 | Janus et al. ................. 385/135 |
| 2002/0150372 A1 | * | 10/2002 | Schray ........................ 385/135 |
| 2002/0181924 A1 | * | 12/2002 | Schray ........................ 385/135 |

* cited by examiner

Primary Examiner—Hemang Sanghavi
Assistant Examiner—Scott Knauss
(74) Attorney, Agent, or Firm—Christopher C. Dremann

(57) ABSTRACT

A fiber management frame and an associated interconnection closure are provided that may be configured to house splice connections or to connect pre-connectorized optical fibers by means of connector sleeves. The fiber management frame includes a frame, at least one optical fiber connection tray, and a connector platform including at least one connector sleeve. The connector platform may be detachably mounted to the frame such that the connector platform is removable. In order to provide access to the connector platform, the connector platform may also be slidably connected to the frame. The fiber management frame facilitates routing of the optical fibers. For example, the fiber management frame may include stacks of connector sleeves that are spaced from adjacent stacks to define a gap therebetween through which optical fibers may be routed. The connector platform may also include at least one routing guide for guiding optical fibers to respective connector sleeves.

30 Claims, 6 Drawing Sheets

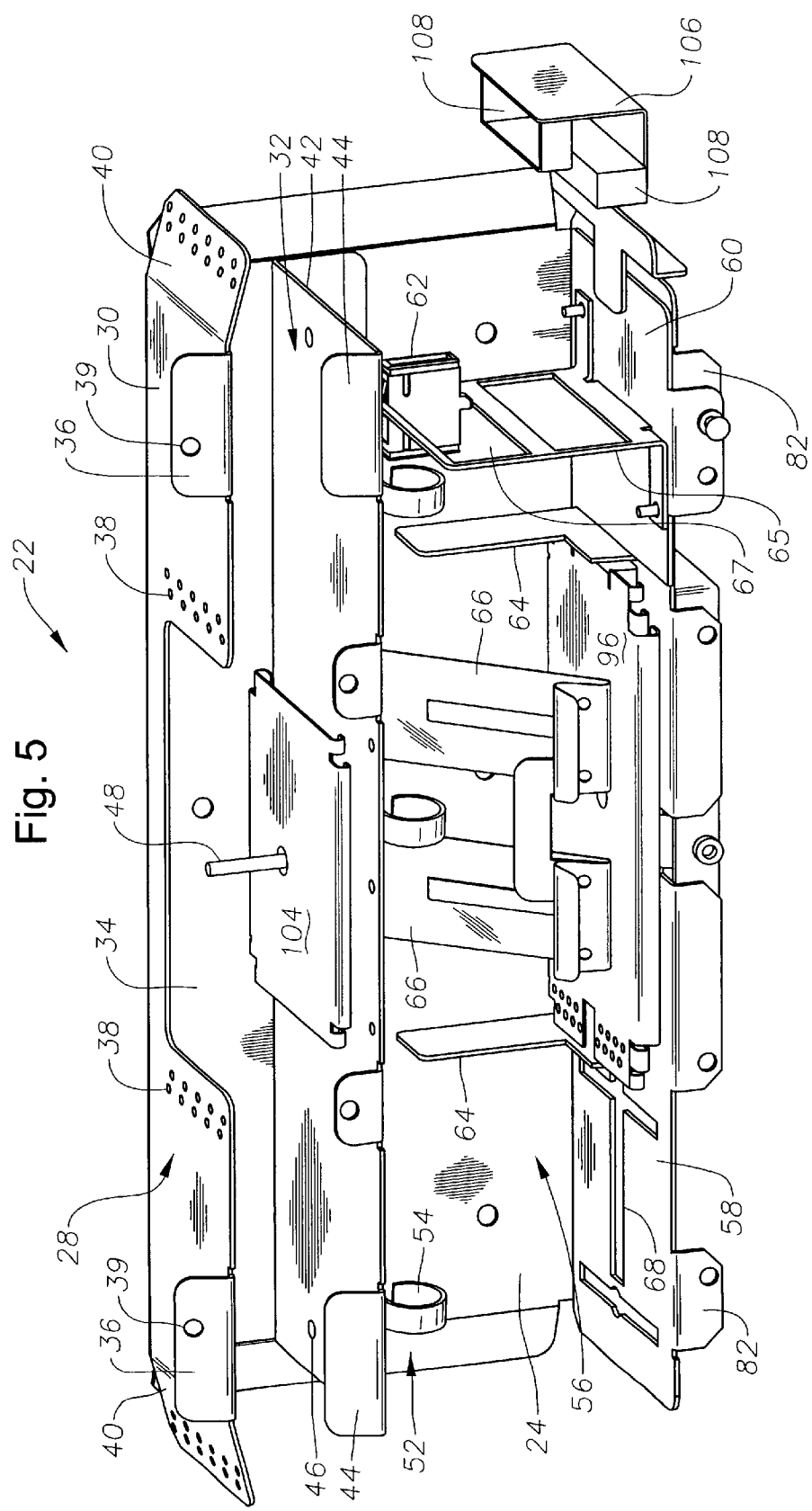

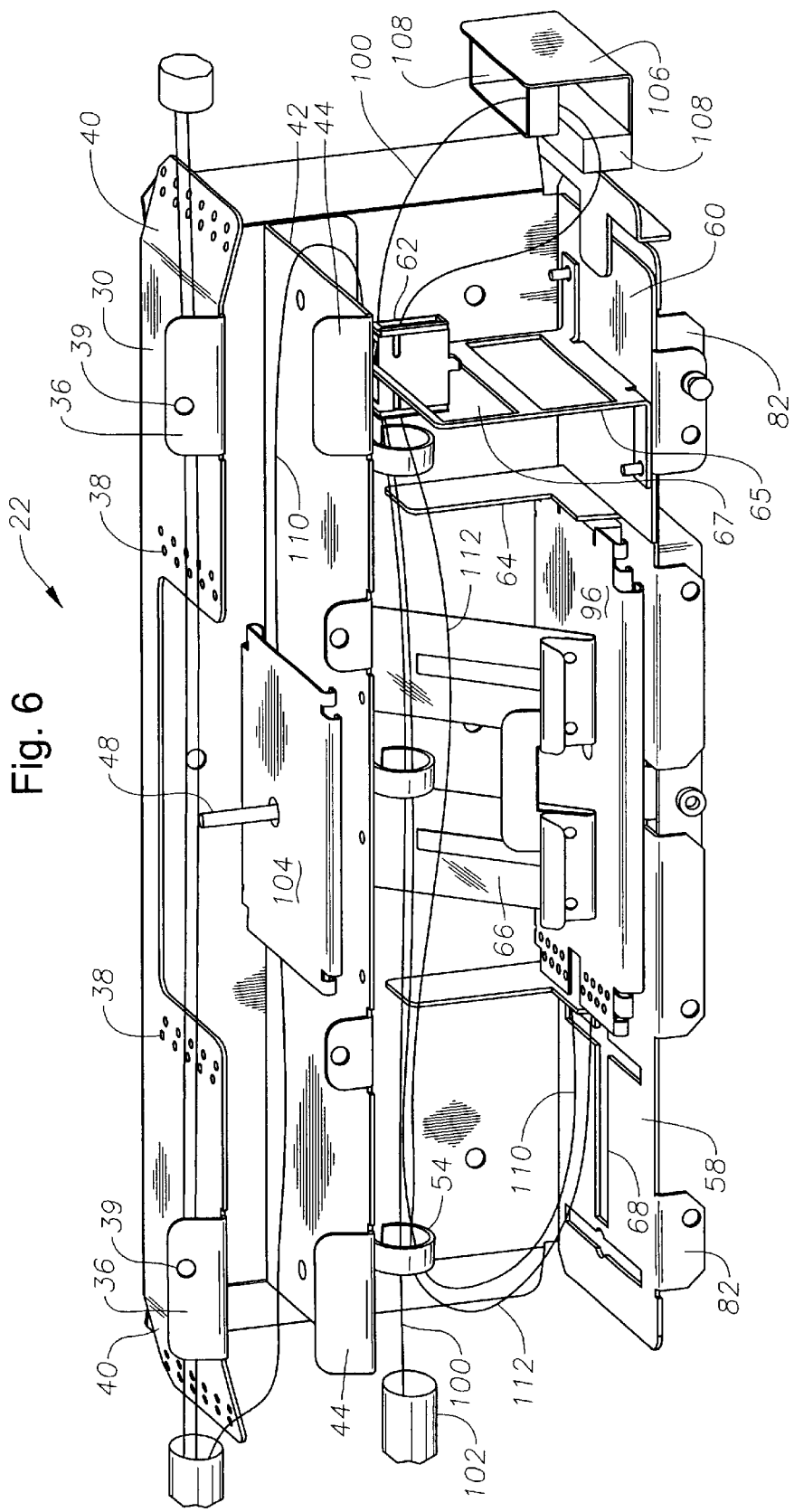

FIBER MANAGEMENT FRAME HAVING CONNECTOR PLATFORM

FIELD OF THE INVENTION

The present invention relates generally to interconnection closures and, more particularly, to interconnection closures having a fiber management frame that optionally includes a connector platform to facilitate the interconnection of respective pairs of pre-connectorized optical fibers.

BACKGROUND OF THE INVENTION

Fiber optic networks typically include interconnection closures at various connection points throughout the fiber optic network. Typically, these interconnection closures include splice closures, patch closures and the like. For example, splice closures commonly house the splices required to interconnect the optical fibers of one or more fiber optic feeder cables to respective ones of the optical fibers of a fiber optic drop cable. By housing the splices, a splice closure protects the spliced end portions of the optical fibers from environmental degradation, strain and other deleterious forces, thereby increasing the reliability and quality of the splices.

While fiber optic networks have traditionally served as the backbone or trunkline of communication networks to transmit signals over relatively long distances, fiber optic networks are gradually being extended closer to the end points of the communications networks. In this regard, fiber optic networks have been developed that deliver fiber-to-the-curb, fiber-to-the-home; fiber-to-the-business, fiber-to-the-desk and the like. In each of these different types of applications, a closure must be capable of splicing different types of cables to establish the proper interconnections. In this regard, the closure utilized in a fiber-to-the-home, fiber-to-the-business, or fiber-to-the-desk application is mounted upon a fiber optic feeder cable and one or more fiber optic drop cables to permit at least some of the optical fibers of the feeder cable to extend uninterrupted through the splice closure while connecting other optical fibers of the fiber optic feeder cable with optical fibers of a drop cable. In contrast, a closure that is utilized in a fiber-to-the-curb application is mounted upon not just a fiber optic feeder cable and one or more drop cables, but also an electrical feeder cable. In this application, the closure must facilitate the connection of one or more electrical conductors of the electrical feeder cable to corresponding electrical conductors of the drop cable, while permitting the remainder of the electrical conductors to extend uninterrupted through the closure. Additionally, the closure must facilitate the connection of one or more of the optical fibers of the fiber optic feeder cable with respective optical fibers of the drop cable while continuing to permit at least some of the optical fibers of the fiber optic feeder cable to extend uninterrupted through the closure.

In either type of closure, the optical fibers may be connected in different manners. In a splice closure, pairs of optical fibers are spliced together. In splice closures utilized in fiber-to-the-home and fiber-to-the-curb applications, for example, some of the optical fibers of the fiber optic feeder cable are spliced to respective optical fibers of the drop cable. In order to house the splice connections between respective pairs of optical fibers and to protect the splice connections, splice closures generally include one or more splice trays.

The splice connections established within a splice closure are high quality connections. Thus, the optical signals transmitted via respective pairs of optical fibers are not substantially attenuated or otherwise degraded by the splice connection. However, a technician must generally be quite skilled and well trained to accurately splice each respective pair of optical fibers within a splice closure. Even for a technician who is skilled and well trained, the process of splicing each respective pair of optical fibers may be a time consuming task if a relatively large number of splice connections must be established. Depending upon the type of splice connection, such as a mechanical splice, a fusion splice or the like, the technician may also be required to carry a substantial amount of equipment in order to splice the respective pairs of optical fibers.

Although not as common as splice closures, another type of closure has been developed to connect pre-connectorized optical fibers. This type of closure generally includes a number of connector sleeves, typically mounted within a connector bulkhead. By mounting fiber optic connectors upon the end portions of the optical fibers, pairs of optical fibers may be connected by inserting the fiber optic connectors mounted upon the end portions of the optical fibers into opposite ends of a connector sleeve. As will be apparent, a technician may readily connect a number of pairs of optical fibers and may easily reconfigure the connections by merely inserting the fiber optic connectors into different connector sleeves. However, this type of closure requires that fiber optic connectors be mounted upon the end portions of each of the optical fibers to be connected. The connectorization of the optical fibers not only requires the technician to provide the connector hardware, but may also require a substantial amount of time to mount the fiber optic connectors on the end portions of each optical fiber to be connected within the closure. Moreover, the resulting connection is generally of a lower quality than a splice connection with the optical signals being attenuated or otherwise degraded to a greater degree than if the optical fibers had been spliced together. In addition, this type closure typically only includes a small number of connector sleeves, such as six or eight connector sleeves, such that the number of pairs of optical fibers that may be connected in this manner is disadvantageously limited.

Different closures are generally provided to establish splice connections between respective pairs of optical fibers and to connect respective pairs of pre-connectorized optical fibers. Since different closures are provided depending upon the type of connection to be established, technicians must undergo additional training to be able to install each type of closure. Additionally, since different types of closures must be manufactured, additional costs are incurred to design and fabricate each different type of closure and to maintain a stock of each different type of closure in inventory. Accordingly, it would be desirable to provide a single closure capable of connecting respective pairs of optical fibers either by splicing or by inserting the connectorized end portions of the optical fibers into connector sleeves.

SUMMARY OF THE INVENTION

A fiber management frame and an interconnection closure that includes the fiber management frame are provided that may be configured to house splice connections or to connect pre-connectorized optical fibers by means of respective connector sleeves. In addition, the fiber management frame of the present invention is designed to facilitate the configuration of the closure and the routing of optical fibers therethrough.

According to one aspect of the present invention, a fiber management frame for an interconnection closure is provided that includes a frame, at least one optical fiber connection tray carried by the frame, and a connector platform including at least one connector sleeve mounted to the frame. According to one advantageous embodiment, the connector platform is detachably mounted to the frame such that the connector platform may be removed from the frame. By removing the connector platform from the frame, the fiber management frame may be converted from a fiber management frame adapted to connect respective pairs of pre-connectorized optical fibers by means of connector sleeves to a fiber management frame adapted to establish splice connections between respective pairs of optical fibers. Thus, a single fiber management frame may advantageously support each of these different types of connections.

According to one embodiment, the frame defines a plurality of compartments. At least one optical fiber connection tray is disposed within one compartment and the connector platform is disposed within another compartment. In one configuration, for example, the optical fiber connection tray is a splice tray that is disposed in a different compartment than the connector platform. In another configuration, the optical fiber connection tray is a coupler tray that is disposed in a different compartment than the connector platform. In this configuration, a splice tray may also be disposed within the same compartment as the connector platform. In either configuration, the splice tray serves to splice connectorized pigtails onto respective optical fibers, such as respective optical fibers of a fiber optic feeder cable. The connectorized pigtails may then be connected to other pre-connectorized fibers, such as the pre-connectorized optical fibers of a drop cable, by means of the connector sleeves.

The fiber management frame of the present invention is preferably readily accessible during configuration to facilitate the connection of respective pairs of the optical fibers. According to one aspect of the present invention, the fiber management frame includes a frame and a connector platform which, in turn, includes a shelf and a plurality of connector sleeves disposed upon the shelf. The connector platform is slidably connected to the frame to provide access to the connector platform. The connector platform is therefore adapted to move between a stowed position in which the connector platform is proximate the frame and an extended position in which the connector platform protrudes beyond the frame. Thus, the connector platform may be placed in the extended position to configure the closure and may thereafter be placed in a stowed position such that the closure may be closed and placed into service. The connector platform may be slidably connected to the frame in various manners. In one embodiment, however, the frame defines at least one track upon which the connector platform rides.

The fiber management frame is also preferably designed to facilitate routing of the optical fibers. In this regard, the fiber management frame of one aspect of the present invention includes a frame and a plurality of stacks of connector sleeves mounted upon the frame. Each stack of connector sleeves includes a plurality of connector sleeves disposed in a stacked relationship. Advantageously, each stack of connector sleeves is spaced from an adjacent stack to define a gap therebetween. Thus, optical fibers may be routed through the gap, if so desired. The stacks of connector sleeves may be disposed upon a shelf which, in turn, is mounted upon the frame. As described above in connection with other aspects of the present invention, the shelf may be slidably connected to the frame so as to move between stowed and extended positions and may be detachably mounted to the frame such that the shelf and the stacks of connector sleeves may be removed from the frame.

To further facilitate routing of the optical fibers, the fiber management frame of another aspect of the present invention includes a frame, first and second banks of connector sleeves mounted upon the frame in a spaced relationship, and at least one routing guide disposed between the first and second banks of connector sleeves for routing optical fiber to respective banks of connector sleeves. As described above in connection with other aspects of the present invention, the fiber management frame may further include a shelf mounted upon the frame with the first and second banks of connector sleeves being disposed upon the shelf. In one embodiment, the routing guides are spaced from the shelf. For example, the fiber management frame may include a panel that carries the routing guides and that is spaced from the shelf. Thus, the optical fibers engaged by the routing guides may be maintained above the shelf in order to reduce fiber congestion. Moreover, the fiber management frame may include a bias member for operably contacting the panel to prevent undesired movement, including both vibration of the panel and sliding motion of the shelf relative to the frame. As also described above in connection with other aspects of the present invention, the shelf may be slidably connected to the frame so as to move between stowed and extended positions and may be detachably mounted to the frame such that the shelf and the first and second banks of connector sleeves may be removed from the frame.

In addition to the various embodiments of the fiber management frame previously described, interconnection closures are provided according to another aspect of the present invention. The closure includes a housing defining an internal cavity and a plurality of ports opening into the internal cavity for receiving a plurality of cables. The closure also includes a fiber management frame, such as any one of the frame assemblies described hereinabove, disposed within the internal cavity of the housing. According to the present invention, a closure is therefore provided that may be alternately configured to connect respective pairs of pre-connectorized optical fibers by means of one or more connector sleeves or to establish splice connections between respective pairs of optical fibers. In those configurations adapted to connect pre-connectorized optical fibers, the closure of the present invention also facilitates the splicing of connectorized pigtails onto respective optical fibers, such as the optical fibers of a feeder cable in order to provide a convenient technique for connectorizing the optical fibers. In addition, the fiber management frame is preferably designed to facilitate access to the connector platform by permitting the connector platform to be slidably mounted upon the frame, thereby facilitating configuration of the connector platform. In addition, the fiber management frame is advantageously designed to appropriately route and guide optical fibers to respective connector sleeves, and thereby further facilitate configuration of the closure and prevent inadvertent damage to the optical fibers.

BRIEF DESCRIPTION OF THE DRAWINGS

Figure 1:
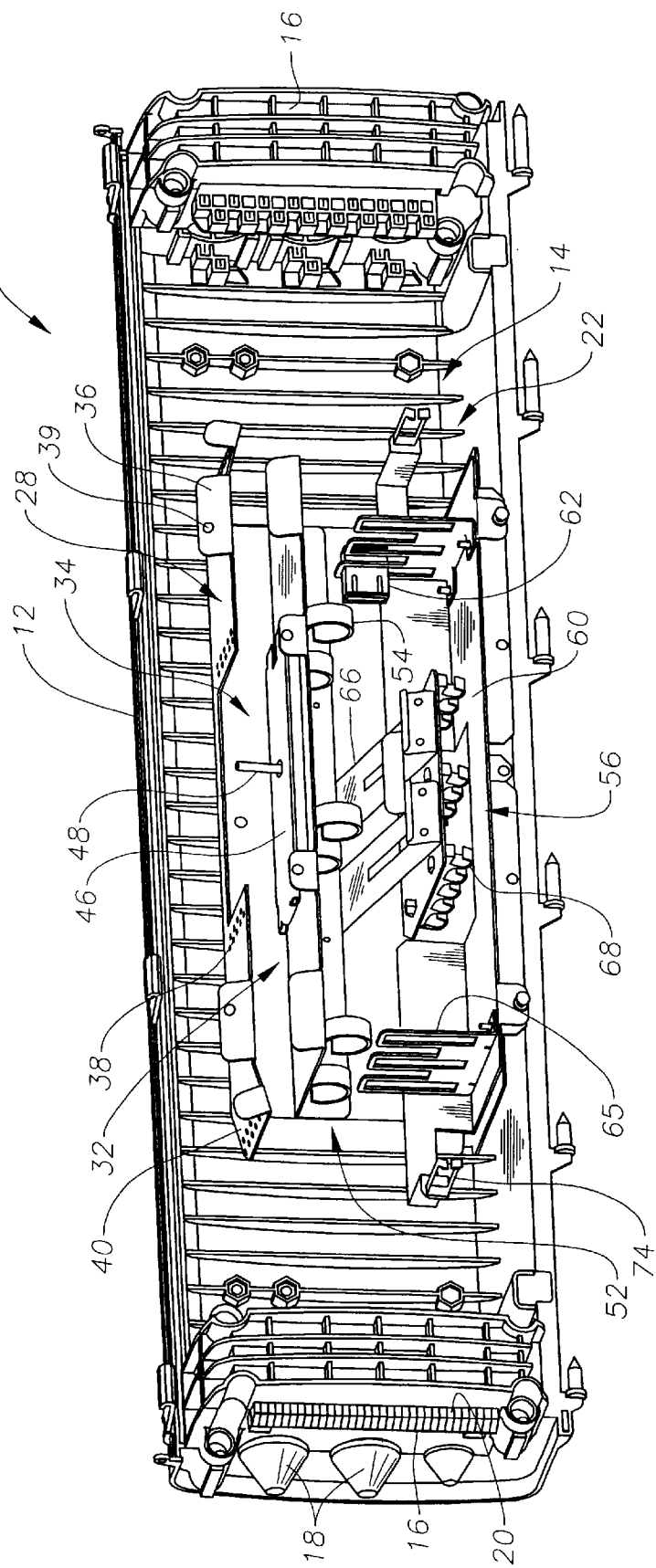
Figure 2:
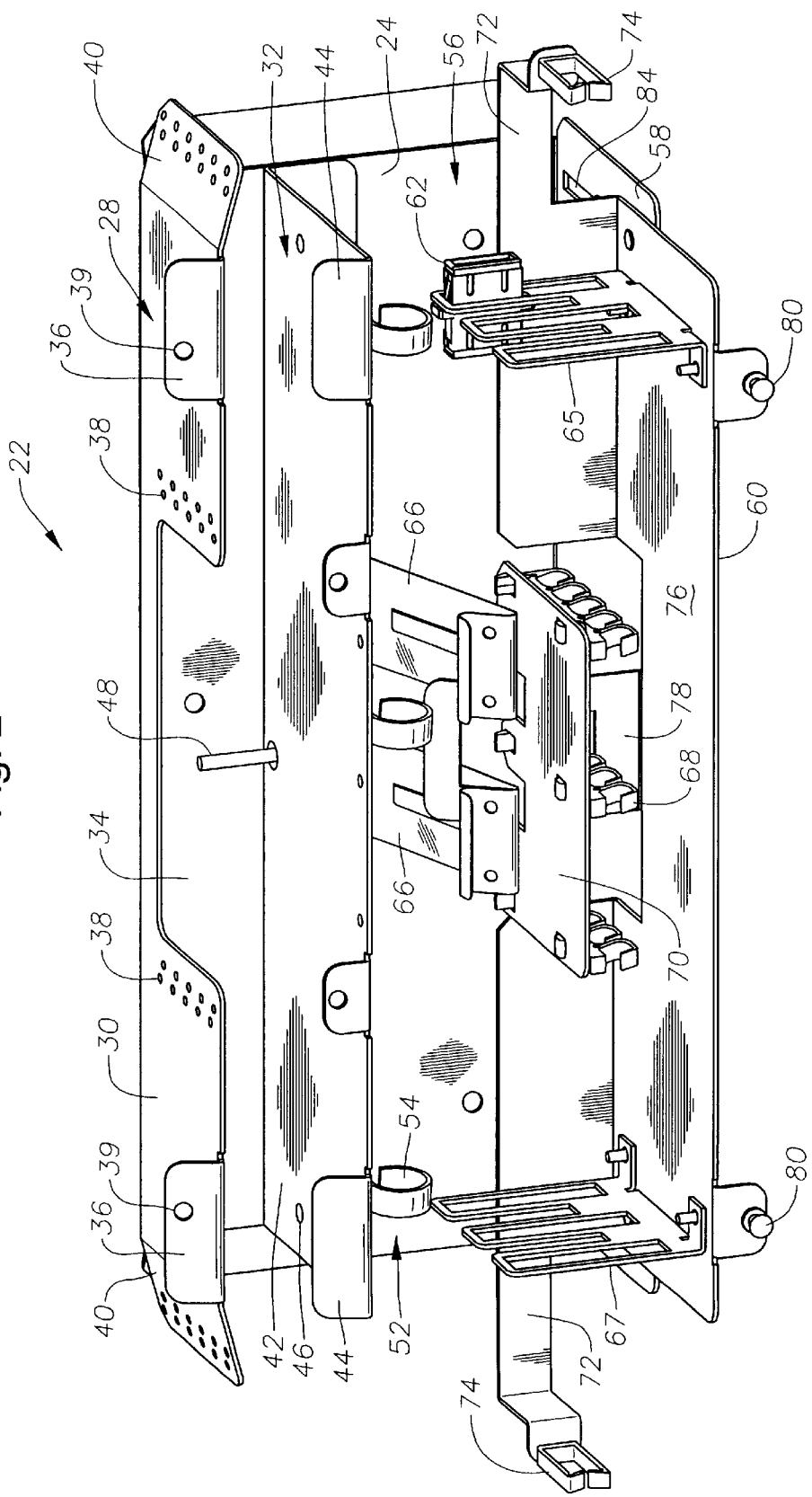
Figure 3:
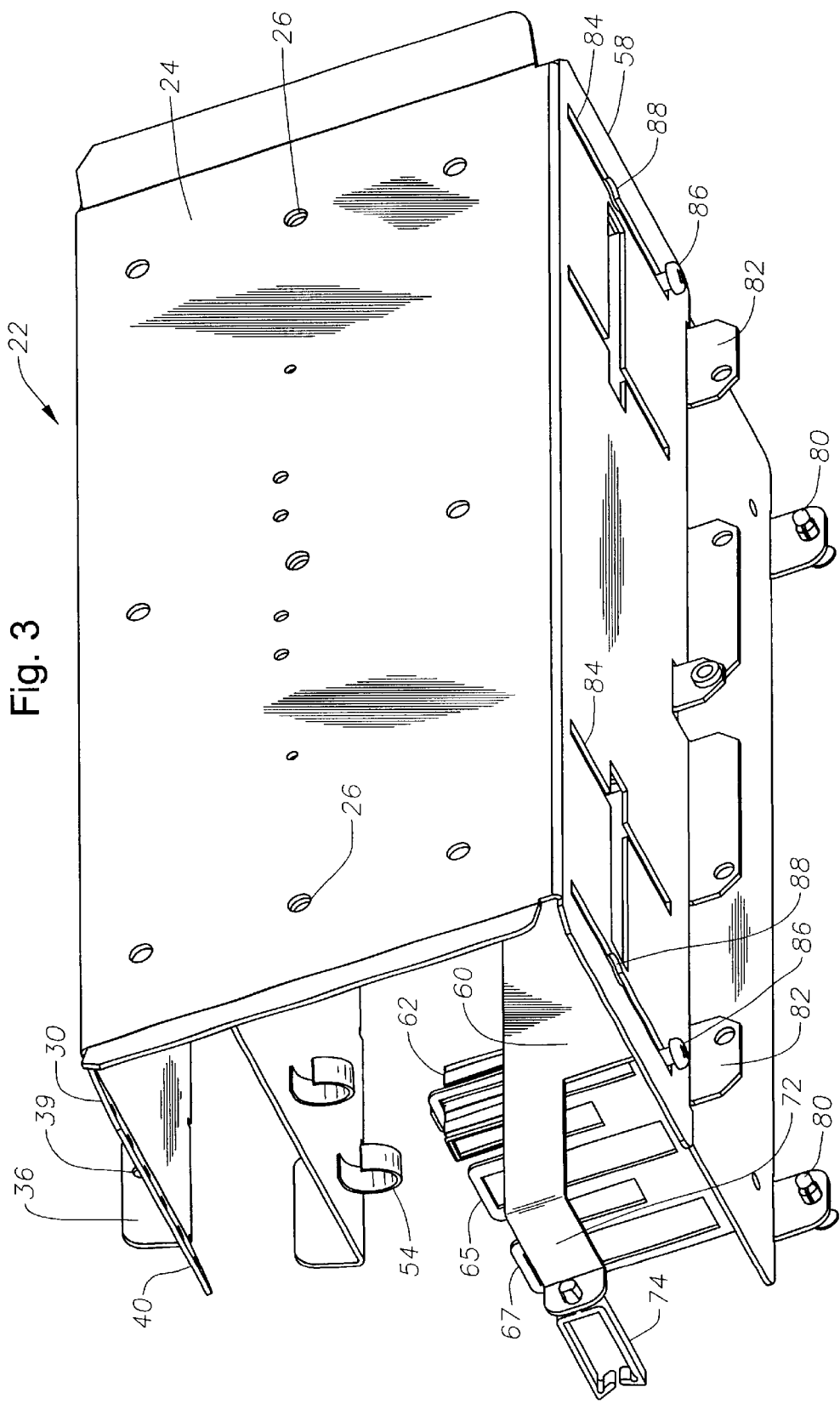
Figure 4:
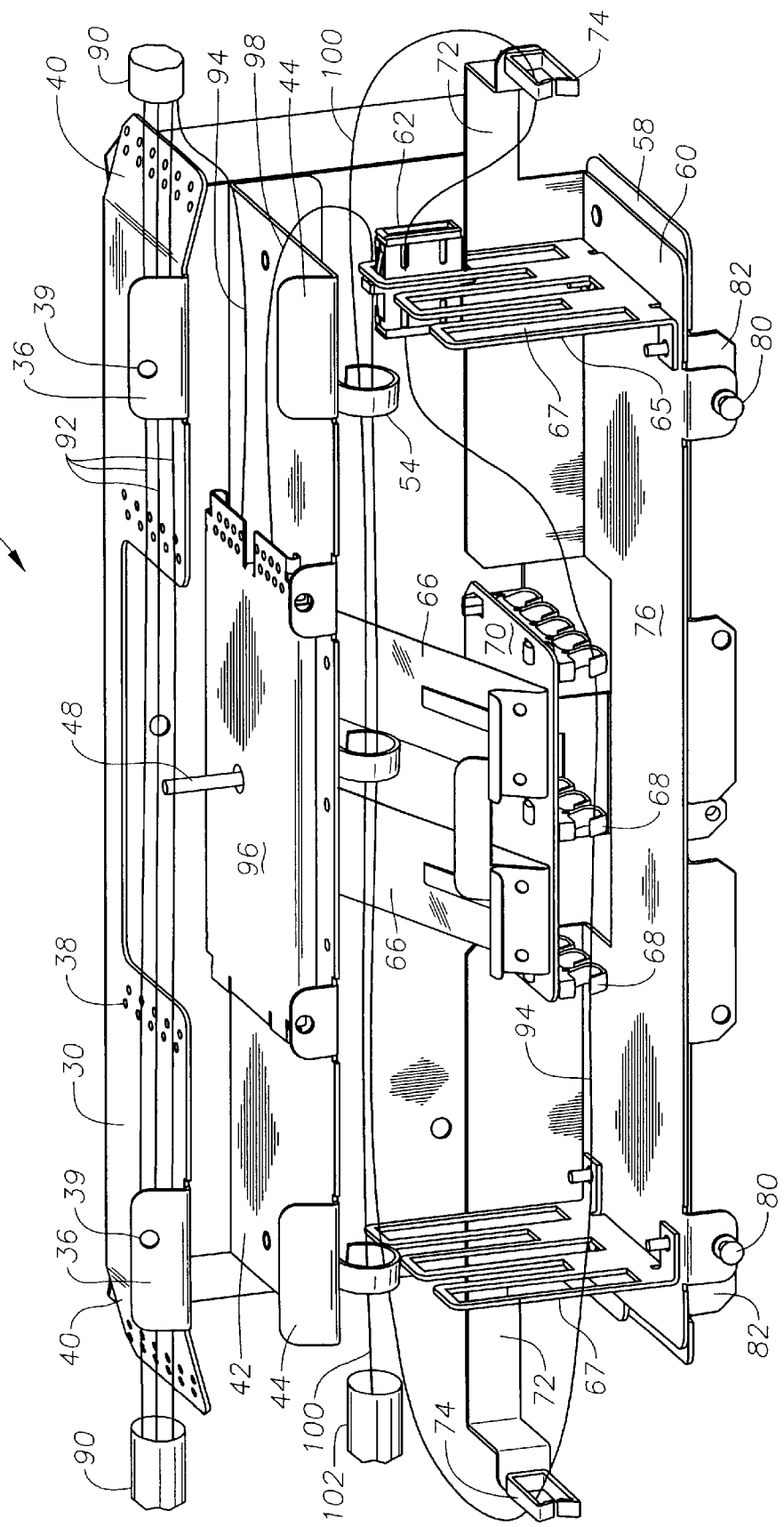

Having thus described the invention in general terms, reference will now be made to the accompanying drawings, which are not necessarily drawn to scale, and wherein:

FIG. 1 is a perspective view of an interconnection closure including a fiber management frame having a connector platform according to one embodiment to the present invention in which a portion of the housing of the interconnecting closure has been removed for purposes of clarity;

FIG. 2 is a perspective view of the fiber management frame of FIG. 1 in which the connector platform has been moved from the stowed position of FIG. 1 to an extended position;

FIG. 3 is a perspective view of the fiber management frame of FIG. 2 that depicts the underneath side of the fiber management frame to more clearly illustrate the manner in which the connector platform is both slidably and detachably connected to the remainder of the fiber management frame;

FIG. 4 is a perspective view of the fiber management frame of FIGS. 1–3 depicting the routing of the optical fibers therethrough;

FIG. 5 is a perspective view of a fiber management frame according to another embodiment of the present invention that includes a coupler tray, a splice tray, and one or more connector sleeves; and FIG. 6 is a perspective view of the fiber management frame of FIG. 5 depicting the routing of optical fibers therethrough.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the preferred embodiments set forth herein; rather, the preferred embodiments are provided so that this disclosure will be thorough and complete, and will fully convey the scope of the invention to those skilled in the art. Like numbers refer to like elements throughout.

Referring now to FIG. 1, an optical fiber interconnection closure 10 according to one advantageous embodiment of the present invention is illustrated. The closure may be a splice closure, a patch closure or the like. Moreover, the closure may be installed in an aerial location, buried, disposed in an enclosure or otherwise sealed. For purposes of example and not of limitation, however, the interconnection closure will be hereinafter described as an aerial splice closure. Although the closure of the illustrated embodiment is an in-line closure, the closure of the present invention may have other configurations, such as a canister or "butt" type closure, without departing from the spirit and the scope of the present invention.

As illustrated, the closure 10 includes a housing 12 defining an internal cavity 14. While the housing may have a variety of shapes, the housing of the illustrated embodiment is generally tubular with a substantially rectangular shape in lateral cross-section. The housing extends lengthwise between a pair of opposed, open ends. The closure also generally includes a pair of end caps 16 disposed within respective ones of the open ends of the housing and secured to the housing, such as by means of an annular collar or other fasteners known to those skilled in the art. While the housing and the end cap may be formed of a variety of materials, the housing and the end caps of one advantageous embodiment are molded of a rigid plastic material.

As known to those skilled in the art and as shown in FIG. 1, the end caps 16 of a splice closure 10 generally define a plurality of ports for receiving respective cables. The ports defined by the end caps may receive a fiber optic feeder cable that extends through the splice closure and the end portions of one or more fiber optic drop cables. While the end caps may define a number of different types of ports, the end caps of the illustrated embodiment include conical-shaped ports 18 for receiving and securely engaging a fiber optic feeder cable or an electrical feeder cable, and a seam 20 defined by a plurality of opposed, flexible fingers through which one or more drop cables extend. As such, in a fiber-to-the-home, fiber-to-the-business, or fiber-to-the-desk application, one or more of the optical fibers of a fiber optic feeder cable may be spliced to respective optical fibers of the fiber optic drop cables within the closure, while the remaining optical fibers of the fiber optic feeder cable extend uninterrupted through the closure. Additionally, in a fiber-to-the-curb application, the end caps define ports for receiving an electrical feeder cable. Thus, one or more of the electrical conductors of the electrical feeder cable may also be spliced to corresponding electrical conductors of the drop cables, while the remaining electrical conductors of the electrical feeder cable extend uninterrupted through the closure. Accordingly, the drop cables in a fiber-to-the-curb application are typically composite cables that include both electrical conductors and optical fibers, as described further below. As will be apparent to those skilled in the art, however, the closure and, more particularly, the end caps may be configured to receive and interconnect other combinations of fiber optic and/or electrical feeder and drop cables, if so desired.

In addition to receiving a variety of different types of cables, the closure 10 may organize and interconnect different types of optical fibers, such as loose buffered optical fibers and ribbon fiber. As such, the term "optical fiber" as used herein is intended to include all types of optical fibers, including loose buffered optical fibers, optical fibers in the form of a multifiber ribbon or any other subunit of a fiber optic cable. Additionally, the optical fiber may have various diameters including diameters of 900 microns, 2 mm and 3 mm.

The closure 10 of the present invention also includes a fiber management frame 22 disposed within the internal cavity 14, as depicted in FIG. 1. The fiber management frame of the illustrated embodiment includes a frame having a back panel 24 that is attached to the housing 12, such as by means of a plurality of bolts or other types of fasteners, that extend through corresponding apertures 26 defined by the back panel and engage the housing. As depicted, the fiber management frame may be mounted within a medial portion of the housing. However, the fiber management frame may, instead, be mounted closer to either end of the housing, if so desired. Additionally, while the fiber management frame is depicted to extend lengthwise for about one-half of the length of the housing, the fiber management frame may be either larger or smaller depending upon the size of the housing and the requirements of the particular application. Typically, the fiber management frame is formed of a metal, such as aluminum, although the fiber management frame may be made of other rigid materials, including plastic, if so desired.

Although not necessary for the practice of the present invention, the fiber management frame 22 of the illustrated embodiment includes a number of partitions. As such, the fiber management frame of the present invention will be described in connection with the embodiment having a number of partitions, even though the fiber management frame may have a number of other configurations, if so desired. In the illustrated embodiment, however, the partitions define a plurality of compartments, such as four compartments, each of which extends in a lengthwise direction so as to be in-line relative to the optical fibers and, in some instances, the electrical conductors that extend through the closure 10.

In the illustrated embodiment, the fiber management frame 22 includes first, second, third, and fourth compartments that extend side-by-side in a parallel fashion. The first compartment 28 includes a partition 30 that extends both outwardly from the back panel 24 and lengthwise through the closure 10. The partition 30 separates the first compartment 28 from the second compartment 32. However, the partition defines an opening or a cutout 34 to facilitate access to the second compartment. The first compartment extends lengthwise from a first open end to a second open end. Thus, optical fibers may extend lengthwise through the first compartment as described below in connection with a fiber-to-the-home, fiber-to-the-business, or fiber-to-the-desk application. Alternatively, electrical conductors may extend through the first compartment in a fiber-to-the-curb application.

To retain the optical fibers or the electrical conductors within the first compartment 28, the first compartment may also include at least one and, more typically, a plurality of upturned flanges 36 spaced lengthwise along the outer edge of the partition 30 opposite the back panel 24. Although not illustrated, the first compartment may include a cover for protecting the optical fibers or electrical conductors extending through the first compartment. Preferably, the cover is removable. For example, the cover may be attached by means of a bolt or other type of fastener to the upturned flanges and, in particular to the holes 39 defined by the upturned flanges. Thus, the cover may be removed while the closure 10 is being configured to provide access to the first compartment. Conversely, the cover may be installed following the configuration of the closure to protect the optical fibers or electrical conductors.

Additionally, the partition 30 may define a plurality of holes 38 for receiving tie wraps or other types of fasteners. As such, the tie wraps or other types of fasteners may be wrapped about the optical fibers or the electrical conductors and may extend through at least a pair of the holes defined by the partition to secure the optical fibers or the electrical conductors to the partition. As depicted, the partition may define holes at various locations, including at locations proximate the opposed open ends of the first compartment 28.

In one embodiment, the first compartment 28 also includes an angled ramp 40 projecting outwardly from at least one end and, more typically, both ends, of the partition 30. As depicted, the angled ramp generally slopes slightly downwardly towards the second compartment 32 so as to assist in guiding the optical fibers or the electrical conductors from a respective port 18 and into the first compartment. As also shown, the angled ramp may define a plurality of the holes 38 through which the wraps or other types of fasteners may extend to secure the optical fibers or the electrical conductors, to the partition.

The second compartment 32 of the illustrated embodiment also includes a partition 42 extending both outwardly from the back panel 24 and in a lengthwise direction. As depicted, the partition of the second compartment is spaced somewhat from the partition 30 of the first compartment 28 to define the second compartment therebetween. The second compartment also extends in a lengthwise direction from a first end to a second end. Typically, each end is open for receiving optical fibers.

Like the first compartment 28, the second compartment 32 also preferably includes at least one and, more typically, a plurality of upturned flanges 44 spaced lengthwise along the outer edge of the partition 42 opposite the back panel 24 for retaining the optical fibers within the second compartment. Moreover, the partition of the second compartment may define a plurality of holes 46 for receiving tie wraps or other types of fasteners to secure the optical fibers to the partition of the second compartment as described above in connection with the first compartment. The second compartment may also include an engagement member 48, such as an upstanding peg, for engaging at least one optical fiber connection tray, such as a coupler tray, splice tray or connector panel (hereinafter generically and collectively referred to as "optical fiber connection trays" or simply "trays") that may be stored in the second compartment.

The third compartment 52 of the illustrated embodiment is proximate the second compartment 32 and also extends in a lengthwise direction from a first open end to a second open end. Thus, the third compartment may receive optical fibers, such as the optical fibers of a drop cable, through both the first and second ends. The third compartment is designed to store slack lengths of optical fibers, including the optical fibers of the drop cables and the optical fibers of the fiber optic feeder cable. In the illustrated embodiment, the third compartment includes a plurality of clips 54. The plurality of clips are preferably connected to the underside of the partition 42 of the second compartment. Typically, the clips are arranged in one or more lengthwise extending rows. In the illustrated embodiment, for example, the clips are disposed in two lengthwise extending rows. In addition, the clips are preferably spaced apart in a lengthwise direction to adequately support the optical fiber. The clips of the illustrated embodiment are open rings that permit optical fibers to be inserted into and removed from the rings, although the clips may have other configurations, if so desired. While the third compartment of the illustrated embodiment includes a plurality of clips for retaining optical fibers that extend therethrough, the third compartment may, instead, be formed in other manners, such as by means of another partition extending both outwardly from the back panel 24 and in a lengthwise direction. In this alternative embodiment, the partition of the third compartment is spaced from the partition of the second compartment so as to define a region between the partitions of the second and third compartments through which the optical fibers may extend.

The fourth compartment 56 of the fiber management frame 22 is proximate the third compartment 52 in the illustrated embodiment. The fourth compartment also includes a partition 58 that extends both outwardly from the back panel 24 and in a lengthwise direction. Typically, the fourth compartment extends lengthwise between a first open end and a second open end. As described by U.S. patent application Ser. No. 09/715,585 entitled Fiber Management Frame for Closure, filed Nov. 17, 2000, by Jennifer Battey, et al, and assigned to the assignee of the present application, the content of which is hereby incorporated by reference in its entirety, the fourth compartment may store at least one tray such that the optical fibers of a fiber optic feeder cable may be interconnected with corresponding optical fibers of a drop cable. For example, the fourth compartment may store one or more splice trays such that the optical fibers of a fiber optic feeder cable may be spliced to corresponding optical fibers of a drop cable. Alternatively, the fourth compartment may store one or more connector panels.

The fourth compartment 56 may also include an engagement member for engaging one or more trays. While the engagement member may be an upstanding peg in a similar manner to the engagement member 48 of the second compartment 32, the engagement member of the fourth compartment may include both a pair of adjustable brackets 64 and a bias member. In this regard, the partition 58 of the fourth compartment may define a pair of lengthwise extending slots 68, one of which is proximate each end of the compartment. The engagement member of the fourth compartment may therefore include a pair of adjustable brackets that are slidably engaged within corresponding ones of the lengthwise extending slots. Thus, the adjustable brackets may be slid toward one another until the adjustable brackets contact the opposed ends of the trays. By permitting the adjustable brackets to move in a lengthwise direction, the fourth compartment may accommodate trays of various sizes.

The engagement member of the fourth compartment 56 may also include a bias member that typically consists of one or more tension members 66. The tension members engage the upper surface of the trays, i.e., the surface opposite the partition 58 of the fourth compartment. The tension members apply a bias force to urge the trays toward the partition, thereby securing the trays within the fourth compartment. Typically, the tension members extend downwardly from the partition 42 of the second compartment 32. However, the tension members may extend from the back panel 24 or other portions of the fiber management frame 22, if so desired. The tension members of one embodiment are formed of spring steel. However, the tension members may also be formed of other materials capable of applying the bias force, if so desired. Other details regarding the adjustable brackets 64 and the bias member are provided by co-pending U.S. patent application entitled Fiber Management Frame For Securely Retaining Optical Fiber Connection Trays filed by Jennifer Battey, et al, and assigned to the assignee of the present application, the content of which is also hereby incorporated by reference in its entirety.

In some instances, the optical fibers of a fiber optic feeder cable are not spliced to corresponding optical fibers of a drop cable. For example, fiber optic connectors may be mounted upon the end portions of the optical fibers of the fiber optic feeder cable and the fiber optic drop cable that are to be connected such that each pair of the optical fibers may be connected by inserting the respective fiber optic connectors into a connector sleeve. Since the end portions of the optical fibers of the fiber optic feeder cable are not generally connectorized in advance, the closure 10 of the present invention preferably provides a mechanism for mounting fiber optic connectors upon the end portions of the optical fibers of the fiber optic feeder cable and for connecting the connectorized end portions of the optical fibers of the fiber optic feeder cable and a fiber optic drop cable.

As illustrated in FIG. 1, the fiber management frame 22 may also include a connector platform 60 mounted to the frame within the fourth compartment 56. The connector platform carries one or more connector sleeves 62. Although the connector sleeves may be carried by the connector platform in different manners, the connector platform preferably includes at least one bulkhead 65 for retaining one or more connector sleeves. In the illustrated embodiment, for example, a pair of connector bulkheads are disposed at opposite ends of the connector platform so as to be spaced apart from one another. Each bulkhead may be designed to hold any number of connector sleeves, depending upon the particular application. In this regard, each connector bulkhead may define at least a window 67 that is sized to retain a plurality of connector sleeves in a stacked configuration. Depending upon the number of connector sleeves that are required for the particular application, each connector bulkhead may define two or more stacks of connector sleeves. For example, the connector bulkheads depicted in FIG. 1 are each designed to define three windows for forming three stacks of connector sleeves. Each stack is preferably spaced slightly from adjacent stacks of connector sleeves to define a gap therebetween. As explained in more detail below, the gaps facilitate routing of the optical fibers by permitting optical fibers to extend therethrough.

To further facilitate routing of the optical fibers, the connector platform 60 may include one or more routing guides 68. While the routing guides may have various configurations, the routing guides of one embodiment are ring-like structures having an opening for receiving one or more optical fibers. While the routing guides may be positioned in various manners, the connector platform of one embodiment includes a panel 70 that carries a plurality of routing guides. As shown in FIG. 1, for example, the plurality of routing guides are mounted in several lengthwise extending rows to guide the optical fibers in a lengthwise direction between the connector bulkheads 65. In this regard, the routing guides carried by the panel are preferably positioned between the connector bulkheads to facilitate routing of the optical fibers to respective connector sleeves. In order to further assist in the routing of optical fibers and as described in more detail below, the connector platform may include one or more clips for retaining and guiding at least some of the optical fibers. In the illustrated embodiment, for example, the connector platform includes arms 72 that extend outwardly from each of the opposed ends. Each arm carries a clip 74 through which optical fibers extend in order to appropriately route and guide the optical fibers.

The connector platform 60 is preferably slidably movable relative to the frame. In FIG. 1, for example, the connector platform is shown in a stowed position proximate the frame. Typically, the connector platform would be in the stowed position once the closure 10 has been configured and is placed in service. However, the connector platform of one advantageous embodiment may be slidably moved from the stowed position to an extended position in which the connector platform protrudes beyond the remainder of the frame, as shown in FIG. 2. While in the extended position, the closure may be more readily configured by making appropriate connections between respective pairs of the optical fibers. Once configured, the connector platform may be returned to the stowed position, as shown in FIG. 1.

To facilitate the slidable movement of the connector platform 60, the connector platform may include a shelf 76 upon which the connector bulkheads 65 and the routing guides 68 are mounted. As illustrated, the routing guides and, more particularly, the panel 70 that carries the routing guides, may be disposed above the shelf such that the optical fibers extending through the routing guides are suspended above the shelf. In this regard, the panel may be mounted upon an upstanding member 78 that extends upwardly from the shelf. As illustrated in FIGS. 1 and 2, the bias member, such as the pair of tension members 66, generally engages the upper surface of the panel. The engagement of the upper surface of the panel prevents undesired wobbling or other movement of the panel and the routing guides carried by the panel. In addition, the engagement of the panel by the bias member prevents unintended movement of the connector panel relative to the frame. For example, the engagement of the panel by the bias member while the connector platform is in the extended position prevents the connector platform from being inadvertently slid into the stowed position while the connector platform is being configured until a relatively sizable force is applied that overcomes the bias force exerted by the bias member. Once in the stowed position, the connector platform may be fixed in position by one or more fasteners 80 that engage corresponding apertures defined by the downturned flanges 82 of the partition 58 of the fourth compartment 56.

The connector platform 60 and the frame may be slidably connected in various manners. In one embodiment, however, the frame defines one or more tracks upon which the connector platform rides. As best illustrated in FIG. 3, the partition 58 of the fourth compartment 56 may define at least one and, more typically, a pair of slots 84 extending from one end proximate the back panel 24 of the frame to an opposed end proximate the outer edge of the partition. In addition, the shelf 76 includes a pair of rods 86 that extend outwardly from the shelf and engage corresponding slots. Each rod is preferably headed with the diameter of the head being greater than the width of the slot. As such, the movement of the rods through the corresponding slots guides the connector platform as the connector platform is moved between the stowed and extended positions. However, the headed portion of each rod will prevent the connector platform from being inadvertently disconnected from the frame.

Although the headed rods 86 prevent the connector platform from being inadvertently disconnected from the frame, the fiber management frame 22 may be designed such that the connector platform 60 may be removed from the frame, if so desired. In the illustrated embodiment, for example, the slots 84 defined by the partition 58 of the fourth compartment 56 may include an enlarged region 88 having a diameter greater than the diameter of the head of the respective rods. Thus, by positioning the connector platform, typically in an intermediate position between the stowed and extended positions, such that the rod is centered within the enlarged portion of the respective slot, the connector platform may then be lifted upwardly and removed from the fiber management frame. The connector platform may be removed for various reasons. By removing the connector platform, however, one or more splice trays or connector panels may be stored within the fourth compartment such that the fiber management frame may function as described by the aforementioned U.S. patent application Ser. No. 09/715,585. In this regard, splice connections may be established between optical fibers of a fiber optic feeder cable and optical fibers of a fiber optic drop cable. However, if the optical fibers of the fiber optic feeder cable and/or the fiber optic drop cable are pre-connectorized, the connector platform may be slidably mounted to the frame so as to facilitate connection between the pre-connectorized optical fibers.

The fiber management frame 22 of the present invention may be utilized in various applications, including fiber-to-the-home and fiber-to-the-curb applications. By way of example, the configuration of the fiber management frame in a fiber-to-the-home application will be hereinafter described with the details regarding the fiber-to-the-curb application provided by the aforementioned U.S. patent application Ser. No. 09/715,585. In a fiber-to-the-home application as depicted in FIG. 4, a fiber optic feeder cable 90 extends through the closure 10 with one or more of the optical fibers 94 of the fiber optic feeder cable being split from the fiber optic feeder cable and spliced or otherwise interconnected with corresponding optical fibers of one or more fiber optic drop cables. The fiber optic drop cables then exit the closure and extend to a home, business, desk, or the like.

With more particular reference to FIG. 4, for example the optical fibers of the fiber optic feeder cable 90 enter the closure 10 through a respective port 18 defined by one end cap 16 and are split into two groups, the first group of the optical fibers being express fibers 92 that extend uninterrupted and unspliced through the closure. These express fibers extend through the first compartment 28 of the fiber management frame 22 and exit the closure through a respective port defined by the opposite end cap. The other optical fibers 94 of the fiber optic feeder cable that are split from the express fibers are directed to the second compartment 32.

In the fiber-to-the-home application, the fiber management frame 22 may include one or more splice trays 96 stored within the second compartment 32. In this regard, each splice tray preferably defines an aperture through a medial portion thereof. As such, each splice tray may be positioned within the second compartment such that the engagement member 48 of the second compartment extends through the aperture and thereby retains the splice tray. The optical fibers 94 of the fiber optic feeder cable 90 that have been split from the express fibers 92 are typically routed to the splice tray. Pre-connectorized pigtails, that is, relatively short lengths of optical fibers having fiber optic connectors mounted upon one end thereof, are spliced to end portions of the optical fibers of the fiber optic feeder cable within the splice tray to connectorize the optical fibers of the fiber optic feeder cable that have been routed to the splice tray. Thus, the optical fibers 98 emerging from the splice tray have fiber optic connectors mounted upon the end portions thereof. The connectorized fibers emerging from the splice tray are then routed to the third compartment 52. Once in the third compartment, the optical fibers preferably are looped one or more times to provide slack lengths of the optical fibers. The optical fibers then emerge from the third compartment and are routed to the fourth compartment 56 in which the connector platform 60 is disposed.

While the optical fibers emerging from the third compartment 56 may be routed in various manners, the optical fibers are typically routed through a clip 74 and then extend through a gap between a pair of adjacent stacks of connector sleeves 62. The optical fibers are also typically guided by one or more of the routing guides 68 to a respective connector sleeve. The fiber optic connector mounted upon the end portion of each optical fiber is then inserted into one end of the respective connector sleeve. The pre-connectorized optical fibers 100 of the fiber optic drop cable 102 also typically extend through a clip such that the fiber optic connectors mounted upon one end portions thereof may be inserted into the opposite end of respective connector sleeves. By inserting the fiber optic connectors mounted upon the end portions of the optical fibers of the fiber optic feeder cable and the fiber optic drop cable into opposite ends of a respective connector sleeve, optical connections may be established between respective pairs of optical fibers.

As illustrated in FIG. 4, the optical fibers 98 that emerge from the splice tray 96 and are routed through the third compartment 52 may be routed through the fourth compartment 56 in either direction, i.e., from an entry point on the right-hand side of the connector platform 60 to a connector sleeve 62 on the left-hand side of the connector platform or from an entry point on the left-hand side of the connector platform to a connector sleeve on the right-hand side of the connector platform. Similarly, the pre-connectorized optical fibers 100 of the fiber optic drop cable 102 may enter from either side of the closure 10 and may similarly be routed one or more times through the third compartment to store slack lengths thereof, if so desired. As such, optical fibers 94 from the fiber optic feeder cable 90 may be interconnected with corresponding optical fibers of a fiber optic drop cable. The fiber optic drop cable then exits the closure and extends to a home, business, desk, or the like.

In some instances, the optical fibers 94 of the fiber optic feeder cable 90 must be split prior to being connected to respective optical fibers 100 of the fiber optic drop cable 102. In these instances, a coupler tray 104 is disposed from the second compartment 32 and the optical fibers of the fiber optic feeder cable that are split from the express fibers 92 are directed to the second compartment and, more particularly, to the coupler tray. As known to those skilled in the art, optical fibers that are input into a coupler tray are split, typically two, three, four or more ways. Thus, a first optical fiber that enters the coupler tray is generally split into a plurality of second optical fibers.

Since the coupler tray 104 is disposed within the second compartment 32, the splice tray 96 must be disposed elsewhere to splice pre-connectorized pigtails onto the end portions of the optical fibers that emerge from the coupler tray. As illustrated in FIG. 5, the splice trays may be disposed within the fourth compartment 56 and may be retained therewithin by means of a pair of adjustable brackets 64 and the bias member that are described in more detail by U.S. patent application Ser. No. 09/715,585 and the aforementioned co-pending U.S. patent application entitled Fiber Management Frame For Securely Retaining Optical Fiber Connection Trays. In this configuration, the connector platform 60 is typically mounted at one end of the partition 58 of the fourth compartment proximate one end of the splice tray. The connector platform preferably includes a connector bulkhead 65 for retaining a plurality of connector sleeves 62. In addition, the connector platform may include an outwardly extending arm 106 carrying one or more clips 108 for guiding and routing optical fibers to the connector sleeves.

As depicted in FIG. 6 in a fiber-to-the-home application, one or more optical fibers 94 of a fiber optic feeder cable 90 are split from the express fibers 92 and are directed to a coupler tray 104 disposed within the second compartment 32. The optical fibers that are input to the coupler tray are split into a plurality of optical fibers and the optical fibers 110 emerging from the coupler tray are then routed through the third compartment 52 in order to store slack lengths of the optical fibers. The optical fibers are then directed to the splice tray 96 in the fourth compartment 56 and pre-connectorized pigtails are spliced onto the end portions of the optical fibers within the splice tray. The pre-connectorized pigtails 112 are then routed to the connector sleeves 62 and the fiber optic connectors mounted upon the end portions of the pigtails are inserted into respective connector sleeves.

As described above, the pre-connectorized optical fibers 100 of a fiber optic drop cable 102 are also typically routed through the third compartment 52 to store slack lengths of the optical fiber. The fiber optic connectors mounted upon the end portions of the optical fibers of the fiber optic drop cable are then inserted into respective connector sleeves 62 in order to optically connect with respective optical fibers 94 of the fiber optic feeder cable 90. As such, the connector platform 60 of the embodiment depicted in FIGS. 5 and 6 permits pre-connectorized optical fibers to be connected, even in instances in which the closure 10 also includes a coupler tray 104 for splitting some optical fibers of the fiber optic feeder cable.

The connector platform 60 of this embodiment is typically connected to the partition by means of one or more fasteners 114. In this regard, the fasteners may engage corresponding apertures defined by the downturned flanges 82 of the partition 58 of the fourth compartment 56. As such, the connector platform of this embodiment may also be removed from the end of the frame such that the fiber management frame 22 may be utilized to establish splice connections between the optical fibers 94, 100 of the fiber optic feeder cable 90 and the fiber optic drop cable 102 in the manner described by the U.S. patent application Ser. No. 09/715,585.

While the configuration of the frame assemblies 22 of the present invention have been described in connection with a fiber-to-the-home application, the frame assemblies may also be configured for fiber-to-the-curb applications as described by U.S. patent application Ser. No. 09/715,585. In addition, while the frame assemblies of certain advantageous embodiments have been illustrated and described, the fiber management frame may have other configurations, if so desired. For example, the various compartments may have different heights and widths. Additionally, the compartments may be oriented differently with the fourth compartment 56 being the topmost compartment and the first compartment 28 being the lowermost compartment. In order to facilitate the splicing of the optical fibers 94 of the fiber optic feeder cable 90 with connectorized pigtails, the fiber management frame may also include a splicing platform for holding an optical fiber connection tray during, for example, splicing operations as described by U.S. patent application Ser. No. 09/715,585.

Regardless of the application, once the closure 10 has been appropriately configured by establishing the desired connections between respective pairs of the optical fibers, the cover of the first compartment 28 is installed. In this regard, the cover is typically connected to one or more of the upstanding flanges 36 of the first compartment so as to extend at least partially over the optical fibers and/or electrical conductors disposed within the first compartment to protect the optical fibers and/or the electrical conductors. Thereafter, the housing 12 may be assembled and the closure placed into service.

As described above, various optical fibers are stored and routed by the fiber management frame 22 in both fiber-to-the-home and fiber-to-the-curb applications. While the optical fibers may extend unprotected through the closure 10, the optical fibers are typically disposed in buffer tubes or transport tubes to further protect the optical fibers. Although not depicted in FIGS. 4 and 6, the optical fibers 94 of the fiber optic feeder cable 90 and the optical fibers 96 extending from the tray in the second compartment 32 to the fourth compartment 56 are typically disposed in transport tubes, while the optical fibers 100 of the drop cables 102 are typically disposed in buffer tubes for added protection.

According to the present invention, a closure 10 is therefore provided that may be alternately configured so as to connect pre-connectorized optical fibers by means of one or more connector sleeves 62 or to establish splice connections between respective pairs of optical fibers. In those configurations adapted to connect pre-connectorized optical fibers, the closure of the present invention facilitates the splicing of connectorized pigtails onto respective optical fibers, such as the optical fibers 94 of a fiber optic feeder cable 90 to provide a convenient technique for connectorizing the optical fibers. In addition, the fiber management frame is preferably designed to facilitate access to the connector platform 60 by permitting the connector platform to be slidably mounted relative to the frame, thereby facilitating configuration of the connector platform. In addition, the fiber management frame is advantageously designed to appropriately route and guide optical fibers to respective connector sleeves to further facilitate configuration of the closure and to prevent damage to the optical fibers.

Many modifications and other embodiments of the invention will come to mind to one skilled in the art to which this That which is claimed is:

1. A fiber management frame for an interconnection closure comprising:
   a frame;
   at least one optical fiber connection tray carried by the frame; and
   a connector platform mounted to the frame, the connector platform comprising first and second banks of connector sleeves disposed in a spaced apart relationship, the connector sleeves for interconnecting a pair of optical fibers having connectors mounted upon the ends thereof;
   wherein the frame defines a plurality of compartments with the at least one optical fiber connection tray disposed within one compartment and the connector platform disposed within another compartment.

2. A fiber management frame according to claim 1 wherein the connector platform is detachably mounted to the frame such that the connector platform is capable of being removed from the frame.

3. A fiber management frame according to claim 1 wherein the at least one optical fiber connection tray comprises a coupler tray.

4. A fiber management frame according to claim 3 further comprising a splice tray disposed within the same compartment as the connector platform.

5. A fiber management frame according to claim 4 wherein the connector platform is mounted proximate one end of the frame.

6. A fiber management frame according to claim 1 wherein the at least one optical fiber connection fray comprises a splice tray.

7. A fiber management frame according to claim 1 wherein the connector platform further comprises at least one routing guide for routing optical fiber to respective connector sleeves.

8. An interconnection closure comprising:
   a housing defining an internal cavity and a plurality of ports opening into the internal cavity for receiving a plurality of cables; and
   a fiber management frame disposed within the internal cavity of the housing, the fiber management frame comprising:
   a frame;
   at least one optical fiber interconnection tray carried by the frame; and
   a connector platform mounted to the frame, the connector platform comprising first and second banks of connector sleeves disposed in a spaced apart relationship;
   wherein the frame defines a plurality of compartments with the at least one optical fiber connection tray disposed within one compartment and the connector platform disposed within another compartment.

9. An interconnection closure according to claim 8 wherein the connector platform is detachably mounted to the frame such that the connector platform is capable of being removed from the frame.

10. An interconnection closure according to claim 8 wherein the at least one optical fiber connection tray comprises a coupler tray.

11. An interconnection closure according to claim 10 further comprising a splice tray disposed within the same compartment as the connector platform.

12. An interconnection closure according to claim 11 wherein the connector platform is mounted proximate one end of the frame.

13. An interconnection closure according to claim 8 wherein the at least one optical fiber connection tray comprises a splice tray.

14. An interconnection closure according to claim 8 wherein the connector platform further comprises at least one routing guide for routing optical fiber to respective connector sleeves.

15. A fiber management frame for an interconnection closure comprising:
   a frame;
   at least one optical fiber connection tray carried by the frame; and
   a connector platform comprising a shelf and first and second banks of connector sleeves disposed upon the shelf in a spaced apart relationship, the connector platform slidably connected to the frame and adapted to move between a stowed position in which the connector platform is proximate the frame and an extended position in which the connector platform protrudes beyond the frame;
   wherein the frame defines a plurality of compartments with the at least one optical fiber connection tray disposed within one compartment and the connector platform disposed within another compartment.

16. A fiber management frame according to claim 15 wherein the frame defines at least one track upon which the connector platform rides.

17. A fiber management frame according to claim 15 wherein the connector platform is detachably mounted to the frame such that the connector platform is capable of being removed from the frame.

18. A fiber management frame according to claim 15 wherein the connector platform further comprises at least one routing guide for routing optical fiber to respective connector sleeves.

19. A fiber management frame for an interconnection closure comprising:
   a frame;
   at least one optical fiber connection tray carried by the frame; and
   at least one stack of connector sleeves mounted upon the frame, the stack of connector sleeves comprising a plurality of connector sleeves disposed in a stacked relationship for interconnecting a pair of optical fibers having connectors mounted upon the ends thereof, at least one of the pair of optical fibers routed from the at least one optical fiber connection tray to one of the connector sleeves;
   wherein the frame defines a plurality of compartments with the at least one optical fiber connection tray disposed within one compartment and the at least one stack of connector sleeves disposed within another compartment.

20. A fiber management frame according to claim 19 further comprising a shelf mounted upon the frame, wherein the connector sleeves are disposed upon the shelf.

21. A fiber management frame according to claim 20 wherein the shelf is slidably connected to the frame and adapted to move between a stowed position in which the shelf is proximate the frame and an extended position in which the shelf protrudes beyond the frame.

22. A fiber management frame according to claim 20 wherein the shelf is detachably mounted to the frame such that the shelf and the connector sleeves are capable of being removed from the frame.

23. A fiber management frame according to claim 19 wherein the connector sleeves are arranged in first and second banks of connector sleeves mounted upon the frame in a spaced relationship.

24. A fiber management frame according to claim 19 further comprising at least one routing guide for muting optical fiber to respective connector sleeves.

25. A fiber management frame for an interconnection closure comprising:

a frame;

a shelf mounted upon the frame;

first and second banks of connector sleeves disposed upon the shelf in a spaced relationship;

at least one routing guide disposed between the first and second banks of connector sleeves for routing optical fiber to respective banks of connector sleeves;

a panel, spaced from the shelf, that carries the at least one routing guide; and a bias member operably contacting the panel.

26. A fiber management frame according to claim 25 wherein the shelf is slidably connected to the frame and adapted to move between a stowed position in which the shelf is proximate the frame and an extended position in which the shelf protrudes beyond the frame.

27. A fiber management frame according to claim 25 wherein the shelf is detachably mounted to the frame such that the shelf and the first and second banks of connector sleeves are capable of being removed from the frame.

28. A fiber management frame according to claim 25 wherein the at least one routing guide is spaced from the shelf.

29. A fiber management frame for an interconnection closure comprising:

a frame;

at least one optical fiber connection tray carried by the frame; and a connector platform mounted to the frame, the connector platform comprising a plurality of stacks of connector sleeves, the connector sleeves for interconnecting a pair of optical fibers having connectors mounted upon the ends thereof;

wherein the frame defines a plurality of compartments with the at least one optical fiber connection tray disposed within one compartment and the connector platform disposed within another compartment.

30. An interconnection closure comprising:

a housing defining an internal cavity and a plurality of ports opening into the internal cavity for receiving a plurality of cables; and a fiber management frame disposed within the internal cavity of the housing, the fiber management frame comprising:

a frame;

at least one optical fiber interconnection tray carried by the frame; and a connector platform mounted to the frame, the connector platform comprising a plurality of stacks of connector sleeves, the connector sleeves for interconnecting a pair of optical fibers having connectors mounted upon the ends thereof;

wherein the frame defines a plurality compartments with the at least one optical fiber connection tray disposed within one compartment and the connector platform disposed within another compartment.

\* \* \* \* \*

UNITED STATES PATENT AND TRADEMARK OFFICE
CERTIFICATE OF CORRECTION

PATENT NO.     : 6,654,536 B2
DATED          : November 25, 2003
INVENTOR(S)    : Jennifer A. Battey and Steve A. Fontaine It is certified that error appears in the above-identified patent and that said Letters Patent is hereby corrected as shown below:

<u>Column 17,</u>
Line 13, delete "muting" and add -- routing --.

Signed and Sealed this

Third Day of February, 2004

JON W. DUDAS
*Acting Director of the United States Patent and Trademark Office*